United States Patent Office 3,573,005
Patented Mar. 30, 1971

3,573,005
PROCESS FOR CLEANING PHOSPHORIC ACID
Avraham Matitiahu Baniel and Ruth Blumberg, Haifa, Israel, assignors to Israel Mining Industries-Institute for Research and Development, Haifa, Israel
No Drawing. Continuation-in-part of application Ser. No. 610,758, Jan. 23, 1967, which is a continuation-in-part of application Ser. No. 438,093, Mar. 8, 1965. This application Nov. 13, 1968, Ser. No. 790,187
Int. Cl. B01d *11/04;* C01b *25/22*
U.S. Cl. 23—312                                                        7 Claims

ABSTRACT OF THE DISCLOSURE

Process which comprises extracting technical-grade phosphoric acid by subjecting said technical-grade phosphoric acid, in the presence of a minor proportion of added sulfuric acid, to extraction with a dialkyl ether, such as diisopropyl ether, separating a phosphoric acid-containing ether extract, and recovering purified phosphoric acid from said ether extract.

---

This application is a continuation-in-part of our application Ser. No. 610,758, filed Jan. 23, 1967, which in turn, is a continuation-in-part of our application Ser. No. 438,093, filed Mar. 8, 1965, said latter application being now abandoned.

This invention relates to the recovery of purified, and possibly more concentrated, phosphoric acid from technical-grade phosphoric acid. In connection with this invention the term "technical-grade phosphoric acid" means aqueous phosphoric acid, usually manufactured by the decomposition of rock phosphate with sulfuric acid, having an $H_3PO_4$ concentration of not less than 35% and possibly up to about 90% and containing the usual impurities of such phosphoric acid.

It has already been suggested that a purer phosphoric acid may be recovered from technical-grade phosphoric acid by extraction with organic solvents, whereby $H_3PO_4$ is extracted and water and impurities are left in the residue. Many widely different solvents have been stated to be suitable for this purpose, apparently without preference for any particular type of solvent. This purification method has not become practical for several reasons: the selectivity of the solvents between phosphoric acid and water, i.e., their capability of preferentially extracting $H_3PO_4$, has been too small; the proportion of $H_3PO_4$ extracted in one single run is too small; from the extract the solvent has to be removed by distillation or re-extraction into water, the former requiring special apparatus and a large consumption of heat, while by re-extraction with water the phosphoric acid becomes diluted.

It has also been proposed, as disclosed in U.S. Pats. Nos. 3,318,661 and 3,367,738, to purify phosphoric acid by contacting impure aqueous phosphoric acid with, in the case of the first of said patents diisopropyl ether, and, in the case of the second of said patents diethyl ether, whereby two separate liquid phases are formed, one of said phases, in the processes of each of said patents, being an aqueous impure phosphoric phase, and the other being a purified phosphoric acid-water-diisopropyl ether or ethyl ether (as the case may be) complex phase, said phases then being separated and the purified phosphoric acid then being recovered from said complex phase. Such procedures are effective.

It has been found, in accordance with this invention, that improved yields of purified phosphoric acid are achieved, even in a single run, in the extractions of technical-grade or impure phosphoric acid with dialkyl ether extraction solvents, pursuant to this invention as described below, by carrying out said extractions in the presence of small proportions of added sulfuric acid, as by incorporating into the technical-grade phosphoric acid said small proportions of sulfuric acid and then carrying out the extraction step with the dialkyl ether. The amount of added sulfuric acid is somewhat variable but, generally speaking, will fall within the range of 0.1 to 5%, and, better still, from about 0.8 to 1.2%, by weight of the phosphoric acid. Surprisingly, although sulfuric acid by itself distributes between water and the dialkyl ether solvents concerned substantially like phosphoric acid in dependence on concentration and temperature, when admixed with phosphoric acid as specified above, it does not distribute in proportion to its content in the mixture but, rather, promotes the transfer of phosphoric acid from the aqueous into the dialkyl ether solvents phase. In consequence, the yield of the purified acid increases. From the dialkyl ether organic solvent extract obtained in this manner purified phosphoric acid can be recovered, as described above and hereafter, that is, by heating the extract to a temperature higher than that at which the extraction is effected. Thus, when proceeding in this manner, the operation of extracting the technical-grade phosphoric acid and separating the extract from the residual technical-grade phosphoric acid are performed at a relatively low temperature at which a clear homogeneous extract is obtained, and this extract is heated to a temperature at which an aqueous acid phase is separated from a dialkyl ether solvent phase.

Still another aspect of the present invention centers about a procedure wherein technical-grade phosphoric acid is first extracted in accordance with the procedure described above and illustrated below, for instance, in Example 1, the residual acid left behind after the separation of the solvent extract is then acidified by the addition of sulfuric acid in an amount of from 30 to 100% by weight of the phosphoric acid present, the resulting mixture is subjected to a repeated extraction with a dialkyl ether solvent, and a mixture of purified phosphoric and sulfuric acid is recovered from the resulting second extract. The mixture of purified phosphoric and sulfuric acid can be obtained from the second dialkyl ether solvent extract, for example, by heating the extract to a temperature higher than that at which the extraction is effected. Thus, when proceeding in this manner, the operation of re-extracting the acidified residual acid and separating the second extract therefrom are preformed at a relatively low temperature at which a clear homogeneous second extract is obtained, and the second extract is heated to a temperature at which an aqueous acid phase is separated from a dialkyl ether solvent phase. Alternatively, the separation of a mixture of purified phosphoric and sulfuric acid from the second extract can be effected by the addition of water to the latter.

Quite generally it may be said that the separation of a mixture of purified phosphoric acid and sulfuric acid from the second extract is conducted in a similar manner as the separation of purified phosphoric acid from the first extract resulting from the extraction of the technical-grade phosphoric acid.

The mixture of phosphoric and sulfuric acid obtained in the foregoing manners can be used, for example, for the decomposition of rock phosphate, the manufacture of fertilizers and the like. The advantage of this aspect of the invention is to enable additional $P_2O_5$ values to be recovered in an industrially utilizable form. An illustrative example of this aspect of the invention is shown below in Example 2.

We are aware of the disclosures of U.S. Pat. Nos. 1,981,145; 2,880,063; and 2,885,265 which deal with processes for the production of phosphoric acid or the purification of phosphoric acid, but the procedures described therein are, in fact, foreign to our present invention.

The dialkyl ether solvents which are employed in the practice of our invention may be represented by the formula R—O—R$_1$, where R and R$_1$ are the same or different alkyl radicals, the total number of carbon atoms in R and R$_1$ being from 2 to 15. It is preferred that the dialkyl ethers which are utilized for the purposes of the present invention be such that R and R$_1$ each contain from 2 to 5 carbon atoms. Illustrative examples of such dialkyl ethers are diethyl ether, diisopropyl ether, di-n-butyl ether, ethyl-isopropyl ether, isopropyl-n-butyl ether, di-n-amyl ether, diisoamyl ether, ethyl-isopropyl ether, and ethyl-isoamyl ether.

The threshold values of phosphoric acid concentration below which the dialkyl ether solvent does no substantially extract H$_3$PO$_4$ from the aqueous acid are different for different dialkyl ether solvents at the same temperature, and also different for the same dialkyl ether solvent at different temperatures. Similarly, the temperatures at which a given system dialkyl ether solvent —H$_3$PO$_4$ is homogeneous and heterogeneous, respectively, are different for different dialkyl ether solvents. All these data can be determined empirically and provide a variability of the conditions under which the extracting operation is carried out in each particular case, having regard to the concentration and degree of impurity of the technical-grade phosphoric acid available as a starting material, and the desired degree of purity and concentration of the extracted phosphoric acid.

In a preferred embodiment of the process according to the invention, the operations of extracting the technical-grade phosphoric acid and separating the extract from the residual technical-grade phosphoric acid are performed at a relatively low temperature at which a clear homogeneous extract is obtained, and this extract is heated to a temperature at which an acid phase is separated from a dialkyl ether solvent phase. This phase separation can be facilitated by heating the extract, or by heating the extract to which has been added a small amount of either water or purified phosphoric acid, a substantial proportion of the dialkyl ether solvent separating from the extract and being easily separated as by decantation. The low temperature utilized in accordance with this preferred embodiment during the extraction can be achieved in any of a number of ways as, for example, by evaporating in vacuo an adequate proportion of the dialkyl ether solvent added to the technical-grade phosphoric acid, this procedure being particularly suitable when the dialkyl ether solvent is a low-boiling one; or, and again by way of illustration, the technical-grade phosphoric acid can be submitted to a heat exchange with a refrigerated brine, either before or after admixture of the dialkyl ether solvent.

The temperature at which the extractions are carried out, while variable, being dependent upon the particular dialkyl ether solvent utilized and other factors, are relatively low and, in most cases, will fall within the range of about —5 to about 80° C. The temperatures to which the initially separated dialkyl ether solvent extracts of the phosphoric acid are heated to bring about phase separation are likewise variable but will generally fall within the range of about 20 to about 100° C., and, better still, in the range of 40–80° C., again dependent upon the particular dialkyl ether solvent utilized and other factors. Where temperature gradients or differences between the extraction temperature and the temperature of heating are relied upon to bring about phase separation, such gradients or temperature differences may vary over wide ranges depending upon selection of particular dialkyl ether solvents and various other factors.

The process according to the invention can be used with particular advantage for single-run extracting operations in which the initial H$_3$PO$_4$ concentration of the technical-grade phosphoric acid is clearly above the threshold value below which the dialkyl ether solvent used does not substantially extract H$_3$PO$_4$ at the working temperature, and so much dialkyl ether solvent is used that by that single-run the H$_3$PO$_4$ concentration of the residual aqueous phosphoric acid is lowered substantially to the threshold value. As the dialkyl ether solvent, the temperature differential between the states of clear solution and phase separation in the extract, and the starting concentration of the technical-grade phosphoric acid can be selected at will, the process according to the invention is highly flexible and adaptable to particular needs. Thus, the respective proportions of purified phosphoric acid and residual technical-grade phosphoric acid can be varied in accordance with requirements.

The yield of the purified acid obtained is dependent on concentration of the crude acid, the distribution coefficient of the acid between the aqueous and dialkyl ether solvent phase as well as the nature and concentration of the impurities in the crude acid. The concentration at which wet process phosphoric acid is practically obtained in industry is limited to about 54% P$_2$O$_5$. Many plants cannot produce an acid over 50% P$_2$O$_5$ due to scaling properties of the acid in high concentrations. This fact, as mentioned, influences the yields of purified phosphoric acid.

In connection with the recovery operations, by addition of a relatively small amount of water to the phosphoric acid-dialkyl ether solution resulting from an extraction of technical-grade or crude phosphoric acid, essentially the entire phosphoric acid is released in one single step in the form of an aqueous phosphoric acid solution whose H$_3$PO$_4$ content is above the threshold value of 35% by weight. Hence, the foregoing procedures can be modified by subjecting technical-grade phosphoric acid to extraction with a dialkyl ether solvent of the type specified above, separating the resulting H$_3$PO$_4$-containing dialkyl ether solvent extract from the residual technical-grade phosphoric acid, adding water to the extract in an amount of from 3 to 20% by weight so as to obtain stratification into two phases, and separating the lower phase in the form of an aqueous solution containing at least 35% by weight of purified phosphoric acid. This procedure differs from the foregoing procedures in the manner in which recovery of the phosphoric acid from the dialkyl ether solvent extract is effected. Whereas, in accordance with the earlier described procedures, such recovery is achieved by raising the temperature of the extract above that at which the extraction was effected, in accordance with this procedure the phase separation is brought about by the addition of water while the temperature is not raised. This procedure will be referred to hereinafter for short as "isothermic procedure." In spite of the fact that, by applying the isothermic procedure the product purified phosphoric acid is somewhat more diluted than an acid obtained from the same technical-grade phosphoric acid with the same dialkyl ether solvent when proceeding in accordance with the earlier procedures, there are cases where the modification is preferred in view of the fact that in this manner the refrigeration equipment is not required.

By the addition of water to the dialkyl ether solvent extract for the separation therefrom of an aqueous purified phosphoric acid in accordance with the isothermic procedure, the mixture will as a rule cool down by several ° C., e.g., 7–9° C. Preferably, this cooling is compensated by a controlled addition of heat so as to keep the temperature of the phases substantially the same as that of the extract prior to the addition of water.

In accordance with one embodiment of the isothermic procedure the required amount of water for bringing about the desired phase separation is added in a one-stage operation.

In accordance with another embodiment of the isothermic procedure the addition of water is effected in two stages. In the first of these only a relatively small portion of the totally required amount of water is added whereby a first fraction of aqueous phosphoric acid is obtained containing the bulk of any impurities that had been co-extracted by the dialkyl ether solvent from the starting technical-grade phosphoric acid. This first fraction which although impure is much purer than the starting technical-grade phosphoric acid may be used for various purposes or be recycled. In the second stage the remainder of the totally required amount of water is added to the dialkyl ether solvent extract and in this manner a highly purified aqueous phosphoric acid is obtained.

In accordance with yet another embodiment of the isothermic procedure, the dialkyl ether solvent extract is first washed in counter-current with water or an aqueous phosphoric acid solution and the thus purified extract is then admixed with the required amount of water. The aqueous phosphoric acid obtained in this manner is of a high degree of purity. In accordance with this embodiment, the counter-current washing of the extract may be conducted in two or more stages.

The various features of the present invention are illustrated by the following examples which are not to be construed as limitative since various changes and modifications can be made in the light of the guiding principles and teachings disclosed. All reference to parts and percentages is by weight.

EXAMPLE 1

To 1,000 g. of wet-process phosphoric acid (50% $P_2O_5$), 10 g. of concentrated $H_2SO_4$ were added in order to increase its acidity to 0.73% $H^+$ (methyl orange as indicator). The acid obtained was mixed with 600 g. of diisopropyl ether at 5° C. for 10 minutes and the dispersion was allowed to separate into a solvent top phase containing dissolved $H_3PO_4$ and an aqueous phosphoric acid bottom phase containing the impurities originally contained in the feed.

The analysis of the aqueous phase was:

0.67% $H^+$ (methyl orange as indicator)
44% $P_2O_5$
1.4% $SO_4$

The analysis of the diisopropyl ether solvent phase was:

0.36% $H^+$ (methyl orange as indicator)
26.3% $P_2O_5$
(Ratio $P_2O_5/SO_4=79.5$)
0.33% $SO_4$ (The separation factor between $P_2O_5$ to $SO_4$ is 2.52.)

The diisopropyl ether solvent phase was heated to 30° C. and, while being heated, was admixed with 40 g. water, phase separation being thereby achieved. The top phase consisted of the diisopropyl ether solvent and contained no more $H_3PO_4$. About 710 g. of $H_3PO_4$ were obtained in the bottom phase which was purified phosphoric acid of a concentration of 46% $P_2O_5$, the yield being 65%.

EXAMPLE 2

The composition of a residual fraction, obtained after removing the cleaned phosphoric acid fraction, and following a procedure such as is described in Example 1, was as follows:

| | Weight percent |
|---|---|
| $P_2O_5$ | 37.8 |
| Fe | 3.3 |
| $Ca^{++}$ | 0.24 |
| $SO_4^{--}$ | 3.7 |

100 g. of this residual fraction were treated with 26 ml. of concentrated sulfuric acid ($d=1.84$). The slurry obtained, therefore, contained 26.8 g. of $H_2SO_4$ and 50.5 g. of $H_3PO_4$. This mixture was contacted with 140 ml. diisopropyl ether at 2° C. The diisopropyl ether solvent phase contained 30 g. of $H_3PO_4$ and 16.65 g. of $H_2SO_4$, the residue containing only 13.8% $P_2O_5$.

We claim:

1. A process of purifying technical grade phosphoric acid, manufactured by the decomposition of rock phosphate with sulfuric acid and having an $H_3PO_4$ concentration of about 35% to about 90%, which comprises subjecting said technical-grade phosphoric acid, in the presence of a minor proportion of added sulfuric acid, to extraction with a dialkyl ether corresponding to the formula R—O—$R_1$ where R and $R_1$ are each alkyl radicals and in which the number of carbon atoms in the total of R and $R_1$ is from 2 to 15, separating a phosphoric acid-containing dialkyl ether extract, recovering purified phosphoric acid from said dialkyl ether extract, acidifying the residual acid left behind after the separation of the dialkyl ether solvent extract by the addition of sulfuric acid in an amount of from 30 to 100% by weight of the phosphoric acid present in said residual acid, subjecting the resulting mixture to extraction with a dialkyl ether corresponding to said formula R—O—$R_1$, and recovering a mixture of purified phosphoric acid and sulfuric acid from the resulting extract.

2. A process according to claim 1, in which the dialkyl ether is diisopropyl ether.

3. A process according to claim 1, wherein the operations of extracting the technical-grade phosphoric acid and separating the extract from the residual acid are performed at a low temperature at which a clear homogeneous extract is obtained and this extract is heated to a temperature at which an aqueous acid phase is separated from a dialkyl ether phase.

4. A process according to claim 1, wherein the operations of repeated extraction of the acidified residual acid and separation of the extract therefrom are performed at a low temperature at which a clear homogeneous second extract is obtained, and this second extract is heated to a temperature at which an aqueous acid phase is separated from a dialkyl ether phase.

5. A process according to claim 1, wherein the mixture of purified phosphoric acid and sulfuric acid is separated from the second dialkyl ether extract by the addition of water to the latter.

6. A process according to claim 1, wherein the operations of extracting the technical-grade phosphoric acid and separating the extract from the residual acid are performed at a relatively low temperature at which a clear homogeneous extract is obtained, and this extract is heated to a temperature at which an aqueous acid phase is separated from a dialkyl ether solvent phase.

7. A process according to claim 6, wherein a small amount of water is admixed with the extract in the phase separation step.

References Cited

UNITED STATES PATENTS

| 1,929,443 | 10/1933 | Milligan | 23—165X |
| 1,981,145 | 11/1934 | Keller | 23—312X |
| 2,885,265 | 5/1959 | Cunningham | 23—312X |
| 3,311,450 | 3/1967 | Alon | 23—165 |
| 3,318,661 | 5/1967 | Schallert | 23—312X |
| 3,363,978 | 1/1968 | Rooij | 23—312X |
| 3,367,738 | 2/1968 | Schallert | 23—312X |
| 3,497,330 | 2/1970 | Baniel | 23—312 |

NORMAN YUDKOFF, Primary Examiner

S. J. EMERY, Assistant Examiner

U.S. Cl. X.R.

23—165